Patented Mar. 29, 1932

1,851,391

UNITED STATES PATENT OFFICE

ERNST KORTEN, OF FRANKFORT-ON-THE-MAIN-FECHENHEIM, GERMANY

PROCESS FOR PRODUCING AMINO DERIVATIVES OF HEXAHYDRODIPHENYL

No Drawing. Application filed June 14, 1930, Serial No. 461,257, and in Germany March 2, 1928.

This application is a continuation in part of my application Serial No. 343,570, filed February 28, 1929.

I have found, that the three-nuclear condensation products which correspond probably to the general formula:

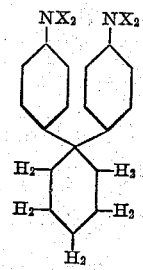

in which formula the X's mean hydrogen or an alkylgroup and one or more hydrogen atoms of the aromatic nuclei as well as of the hydroaromatic residue may be substituted by an alkyl- or alkoxygroup, are converted in one operation into aminoderivatives of hexahydrophenyl by treating the three-nuclear products immediately with hydrogen in the presence of a base metal hydrogenation catalyst, advantageously under superatmospheric pressure and with addition of a suitable diluent.

The aminoderivatives thus obtained are identical with those formed according to the process described in the parent application.

In order to further illustrate my invention the following examples are given, the parts being by weight and all temperatures in centigrade degrees; but I wish it to be understood that my invention is not limited to the examples given, nor to the exact conditions stated therein:—

Example 1

50 parts of 4.4'-diamino-3.3'-dimethyl-diphenyl-cyclohexane, 50 parts of decahydronaphthalene and 2.5 parts of a catalyst, prepared by precipitating the carbonates of nickel, cobalt, copper and bismuth on silica-gel and reducing in a hydrogen atmosphere in the usual manner, are heated to 180° while well stirring under a hydrogen pressure of 60 atmospheres. The absorption of hydrogen occurs rather quickly. The reaction is finished when the amount corresponding to one molecular proportion is taken up. By fractional distillation in vacuo a colorless oil boiling at 168–170° under a pressure of 13 mm. is obtained after small amounts of lower boiling fractions have passed over. The new 4-amino-3-methyl-1'.-2'.3'.4'.5'.6'.-hexahydro-1.1'-diphenyl thus produced in a nearly theoretical yield corresponds probably to the formula:

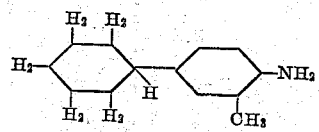

It represents when pure a transparent oil boiling at 175–177° under a pressure of 15 mm., solidifying below 0°.

The process may be carried out likewise when using a catalyst containing about 20% nickel, reduced at about 500° and precipitated on fuller's earth or silica-gel and heating the mixture under a hydrogen pressure of 10 atmospheres.

Example 2

In an open vessel provided with a stirrer and inlet and delivery tubes for gas a solution of 50 parts of 4.4'-diamino-diphenyl-cyclohexane in about 100 parts of tetrahydronaphthalene is heated with addition of 3 parts of a catalyst under ordinary pressure at 130–180° while introducing a current of hydrogen, which advantageously circulates. A suitable catalyst is obtained for instance by precipitating a solution containing about 85% nickel, 15% copper and 5% cerium with sodium carbonate for about 5–10% of its weight.

The course of the reaction can be easily controlled by the fact that in a sample taken out from time to time, when dilute sulphuric acid is added, an increasing amount of the sulphate of the formed 4-aminohexahydrodiphenyl is precipitated. The warm reaction mass is separated from the catalyst and the solvent is expelled from the solution by steam. The hydrochloric acid is added to the residue, from which on cooling the hydrochloric salt of 4-amino-hexahydrodiphenyl crystallizes.

I claim:—

1. A process for producing aminoderivatives of hexahydrodiphenyl which comprises treating three-nuclear condensation products corresponding probably to the general formula:

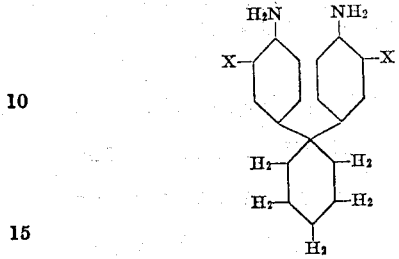

wherein X means hydrogen or a methyl group, with hydrogen in the presence of a carbonate of a heavy metal acting as hydrogenation catalyst.

2. A process for producing aminoderivatives of hexahydrodiphenyl which comprises treating three-nuclear condensation products corresponding probably to the general formula:

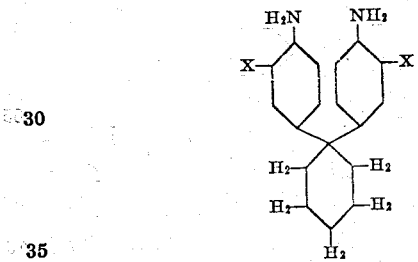

wherein X means hydrogen or a methyl group, with hydrogen under superatmospheric pressure in the presence of a carbonate of a heavy metal acting as hydrogenation catalyst.

3. A process for producing aminoderivatives of hexahydrodiphenyl which comprises treating three-nuclear condensation products corresponding probably to the general formula:

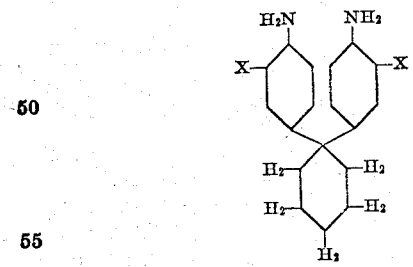

wherein X means hydrogen or a methyl group, with hydrogen under superatmospheric pressure in the presence of a carbonate of a heavy metal acting as hydrogenation catalyst with addition of an inert diluent.

4. A process for producing 4-amino-1'-2'-3'-4'-5'-6'-hexahydro-1.1'-diphenyl which comprises treating 4.4'-diamino-diphenyl-cyclohexane with hydrogen in the presence of a carbonate of a heavy metal acting as hydrogenation catalyst.

5. A process for producing 4-amino-3-methyl-1'-2'-3'-4'-5'-6'-hexahydro-1.1'-diphenyl which comprises treating 4.4'-diamino-3.3'-dimethyl-diphenyl-cyclohexane with hydrogen under superatmospheric pressure in the presence of a carbonate of a heavy metal acting as hydrogenation catalyst.

In testimony whereof, I affix my signature.

ERNST KORTEN.